United States Patent

[11] 3,590,627

| [72] | Inventor | Kyle Campbell |
| | | Bright Walton, Newbury, England |
| [21] | Appl. No. | 871,791 |
| [22] | Filed | Oct. 31, 1969 |
| [45] | Patented | July 6, 1971 |
| [73] | Assignee | Esso Research and Engineering Company |
| [32] | Priority | July 20, 1965 |
| [33] | | Great Britain |
| [31] | | 30,844/65 |
| | | Continuation of application Ser. No. 566,679, July 20, 1966, now abandoned. |

[54] APPARATUS FOR DETECTING POUR POINT
12 Claims, 4 Drawing Figs.

[52] U.S. Cl. ........................... 73/17
[51] Int. Cl. ........................... G01n 25/01
[50] Field of Search ........................... 73/17, 53, 64.1

[56] References Cited
UNITED STATES PATENTS

| 2,423,687 | 7/1947 | Davis et al. | 73/17 |
| 2,437,194 | 3/1948 | Harrington | 73/17 |
| 2,635,456 | 4/1953 | Barstow | 73/17 |
| 2,903,882 | 9/1959 | Hulbert | 73/17 |

FOREIGN PATENTS

| 1,110,589 | 4/1968 | Great Britain | 73/17 |
| 1,127,629 | 1/1961 | Germany | 73/17 |
| 1,487,022 | 5/1967 | France | 73/17 |

OTHER REFERENCES

Stoker, Brandon " A Multiple Coagulometer" in JOURNAL OF SCIENTIFIC INSTRUMENTS Vol. 22, August, 1945

Primary Examiner—James J. Gill
Assistant Examiner—Herbert Goldstein
Attorney—Whelan, Chasan, Litton, Marx and Wright ABSTRACT: A member immersed in a fluid is suspended from a torsional element. Intermittent torsional pulses are applied to the member to displace the member relative to the fluid. The liquid is cooled and when the intermittent pulses are no longer effective to displace the member relative to the fluid the temperature is noted to indicate the pour point of the liquid.

PATENTED JUL-6 1971 3,590,627

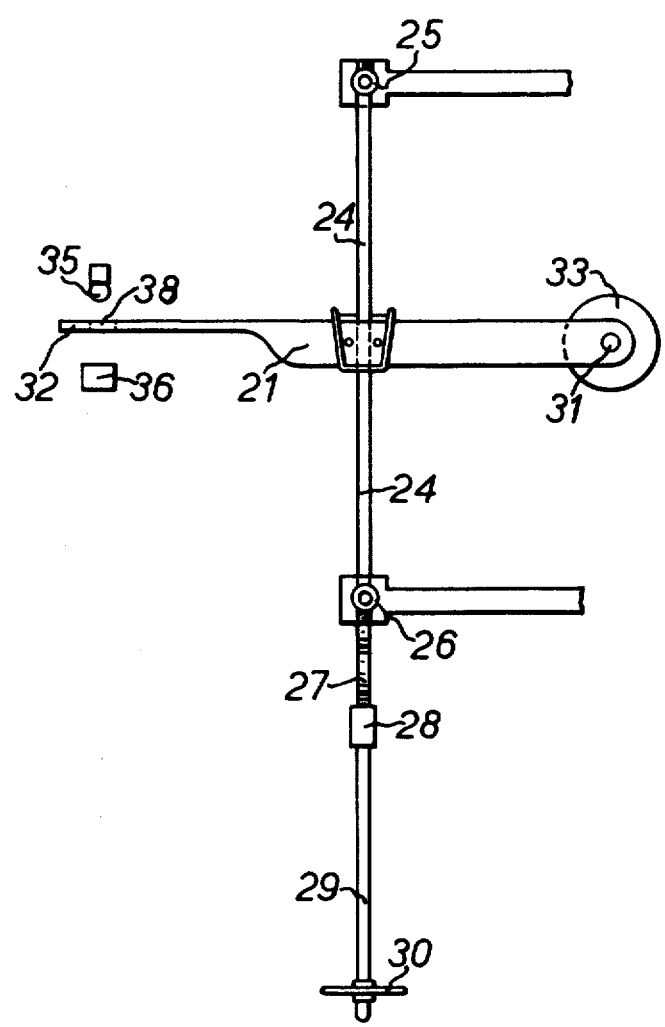
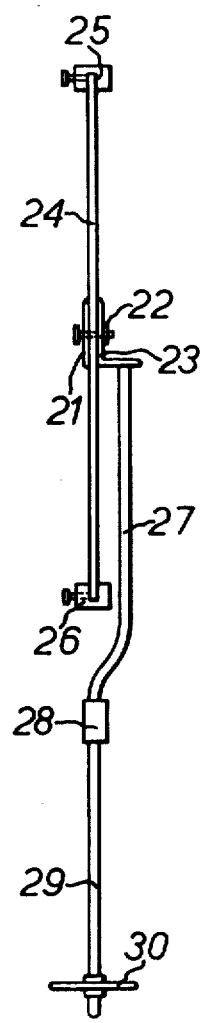
FIG. 2.
FIG. 3.

APPARATUS FOR DETECTING POUR POINT

This is a continuation of application Ser. No. 566,679 filed July 20, 1966, now abandoned.

This invention relates to an apparatus particularly suitable for measuring the pour point of a liquid.

At present, in order to measure the pour point of a liquid, it is necessary to cool the liquid slowly in a container, and periodically tilt the container until the liquid will not move when the plane of its surface is held vertical for 5 seconds. This is time consuming and requires an operator to be present all the time.

In accordance with the present invention, an apparatus suitable for automatically detecting the change in mobility or change of state of a substance (e.g. the pour point of a liquid) comprises a displaceable member suspended in the substance whose physical property is to be determined, a displacer capable of periodically applying a displacing force to said member, a detector for detecting displacements of the member in the substance, and a temperature recorder capable of recording the temperature of the substance when the member in response to a series of periodic displacing forces first remains stationary or first begins to move.

The displaceable member may be of various shapes, such as a plate, cylinder, disc, screen or float. It should preferably be of sufficient size to cause some drag when suspended in the substance whose physical property is to be determined. In one embodiment of this invention the displaceable member is actually a thermometer, preferably provided with a radially disposed disc fitted above the bulb of the thermometer, e.g. on the constriction between the bulb and stem of the thermometer.

The member is suspended freely from a fixed point of the apparatus. Preferably, the suspension is by means of a metal strip or thread, e.g. a thin strip of beryllium-copper alloy. It is preferable of the length of the suspension is adjustable so that there is no difficulty in freely suspending the displaceable member in the substance whose physical property is to be determined, (e.g. a liquid), preferably just below the surface, or in removing the container housing the substance from the apparatus.

The displacer capable of periodically giving displacing forces to the displaceable member, can be any device adapted to give a displacing repulsion or attraction to the member at regular intervals. In a preferred embodiment of this invention, the displaceable member has a strip or vane of iron or steel fixed thereto and extending outwardly from the member. The displacer is an electromagnet connected to a periodic timing device and positioned so that when an electric current is passed through the magnet the strip or vane of iron or steel is attracted towards the magnet, and if free to do so the displaceable member then moves about its suspension. In another preferred embodiment, the displaceable member carries a permanent magnet, and the displacer is a solenoid connected to a periodic timing device. The passage of electric current through the solenoid (which is controlled by the timing device) causes the magnet to be attracted towards the solenoid. Preferably the solenoid and magnet are so positioned that they do not ever touch one another, thereby avoiding the possibility of jamming.

An alternative form of displacer would be a cam-operated device so that once every rotation the cam would cause reciprocating motion resulting in a displacing impulse being given to the displaceable member.

The timing device can be arranged so that the periodic time intervals (e.g. 2 minutes) correspond approximately to a given rise or fall of temperature, e.g. 5° F.

A suitable form of detector for detecting displacements of the displaceable member is a photoelectric cell, the beam of which is interrupted when the member moves. In a preferred embodiment of the invention a photoelectric cell is positioned so that a strip or vane or iron or steel attached to the displaceable member and attracted by an electromagnet, interrupts the beam of the photoelectric cell when the displaceable member moves.

The temperature recorder may take different forms. In one embodiment of the invention, the recorder is the dumbbell shaped index of a maximum or minimum thermometer. In this case the thermometer is also the displaceable member and is bent through 90°, so that the index of the thermometer lies horizontal, and so that the thermometer is suspended from the 90° bend. Preferably a counterweight is attached to the thermometer to balance that portion of the thermometer lying horizontal. When the pour point or freezing point of a liquid is being measured the liquid will be cooled and the index of the thermometer will record the minimum temperature reached. If the apparatus were used for measuring the maximum temperature, e.g. if it were used to determine the melting point of a solid, then the thermometer would be a maximum thermometer and the index would record the maximum temperature.

In an alternative embodiment of the invention, the temperature recorder is an indicating potentiometer in which the pointer is arrested at the temperature when the displaceable member first remains stationary or first begins to move in response to a displacing force. The preferred thermometer is a platinum resistance thermometer, although a thermocouple could be used.

Associated with the apparatus of the invention is a container for housing the substance whose physical property is to be determined. This container should be of a convenient size so that the displaceable member has enough room to move, but not so large that an excessively large quantity of the substance is required.

In order that the substance whose physical property is to be determined may be heated and/or cooled when using the apparatus, the container for the substance should be adjacent to a device for abstracting or supplying heat. A preferred device for this purpose is a thermoelectric cooling/heating pack. These cooling packs can be controlled to provide steady cooling and can also be made to reverse, e.g. to heat, if desired. Thus, when measuring the pour point of a liquid the cooling pack can be set to cool until the displaceable member remains stationary in response to a displacing force. When this stage is reached by means of a double pole change over relay actuated by the photocell, the cooling pack is reversed and starts to heat so that the thermometer index movement is stopped and the container housing the liquid can be readily removed from the apparatus.

Other methods of cooling and heating the container housing the substance whose physical property is to be determined include conventional refrigerators and electric heaters.

The apparatus of the invention may also be provided with an audible alarm system, e.g. an electric bell, which operates when the displaceable member first remains stationary or first begins to move in response to a displacing force. Thus, if the displacement detector is a photoelectric cell, when the displaceable member first remains stationary or first begins to move, whichever is the case, a signal can be given which operates an electric bell.

The apparatus of this invention is eminently suitable for measuring pour points of liquids, e.g. fuel oils. Thus, in a process for measuring the pour point of a liquid a sample of the liquid is placed in the container, the liquid is cooled, e.g. by a cooling pack, the displaceable member is periodically displaced by the displacer until in response to a displacing force the displaceable member remains stationary, and the temperature at which the displaceable member first remains stationary is recorded. Preferably the liquid is thereafter heated, e.g. by reversal of the cooling pack, so that the apparatus can be used for the measurement of the pour point of another liquid.

The apparatus can however by used for measuring the freezing point of liquids. Preferably when using the apparatus the displaceable member is suspended in a liquid which is cooled and then heated, rather than being suspended in solid which is heated and then cooled. When the apparatus is used to determine freezing and melting points, the timer can be set to check vane movement or arrestment at much smaller temperature intervals.

The apparatus of this invention can also be used in equipment for automatic process control of for example refinery streams. Thus, one could check the pour point of lubricating oil in lubricating oil dewaxing plants; or alternatively of fuel oil, heating oil and gas oil streams. In each case a sample of the liquid stream is admitted, (e.g. periodically through automatically operated valves) to a specially designed flow through cell and the pour point automatically recorded by the method herein described, or preferably by a conventional chart recorder.

A particular embodiment of this invention is now described with reference to

FIG. 1 of the drawings which shows a schematic elevation of a pour point apparatus;

FIG 2 shows a side elevation of the assembly;

FIG. 3 shows a side elevation at right angles to that shown in FIG. 2; and

Figure 1:
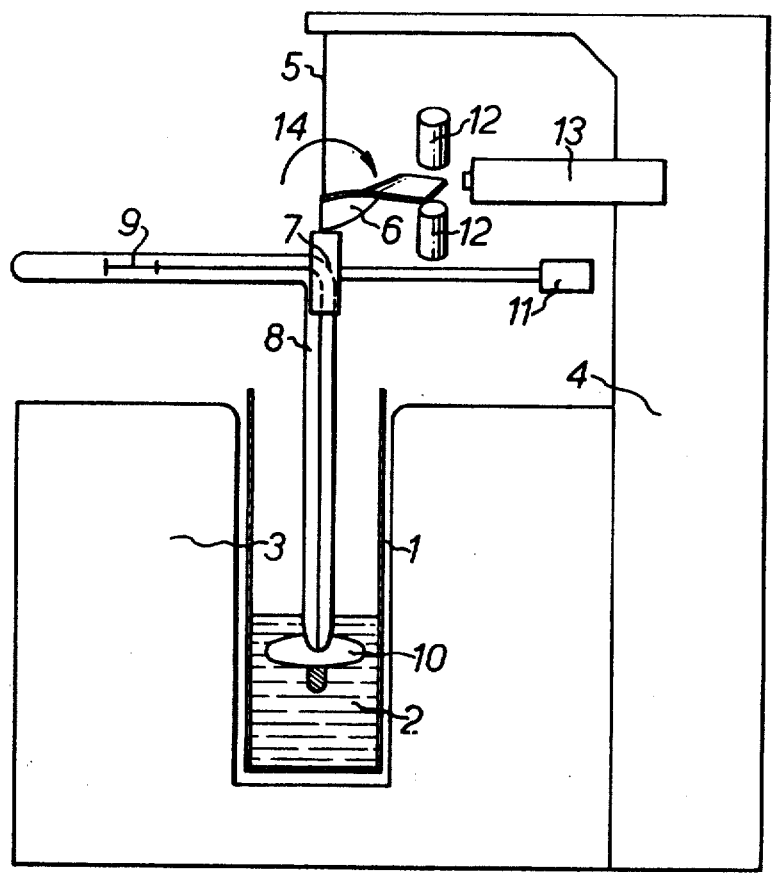

Referring to FIG. 1, the container 1 for the liquid 2 is housed in the cooling bath 3. Suspended from the main body 4 of the apparatus is a strip of beryllium-copper alloy 5, the length of which is adjustable. Attached to the strip 5 is a steel vane 6 and a clamp 7. Attached to the clamp 7 is a mercury thermometer 8 bent through 90° and having an index 9 recording the lowest temperature of the liquid 2. In order to increase the drag of the thermometer a metal or glass disc 10 is fitted around the constriction in the thermometer.

A counterweight 11 is attached to the clamp 7 so as to balance the thermometer when suspended from the strip 5. A photocell is represented at 12 and an electromagnet 13 is positioned so as to attract the vane 6 when current flows through the magnet.

To operate the apparatus, a sample of liquid 2, the pour point of which is to be measured, is placed in the container 1, and the container is placed in its recess in the cooling pack 3. The thermometer 8 is then suspended in the liquid, and the length of the beryllium-copper strip 5 is adjusted so that the thermometer is freely suspended in the liquid with the disc just below the surface of the liquid. If necessary the counterweight 11 is adjusted so that the thermometer is balanced correctly.

The cooling pack 3 is then set and the timer (not shown) started. This timer is set so that at regular intervals, about 5 minutes (corresponding to a temperature drop of about 5° F. in the cooling pack), an electric current passes for a few seconds through the electromagnet 13. The passage of the current causes the vane 6 to be attracted towards the magnet. As long as the liquid 2 is above its pour point, this means that the thermometer 8 is free to rotate in the direction shown by the arrow 14, and the beam of the photocell 12 is interrupted. When however the liquid reaches its pour point, and when the current passes through the electromagnet the vane 6 fails to move and the photocell beam is not interrupted. When this stage is reached the cooling pack is automatically reversed by means of a triggered relay and the liquid is then heated up. The minimum temperature reached i.e. the pour point of the liquid, is automatically recorded by the index 9 of the thermometer.

At the same time as the vane 6 fails to move and the cooling pack is automatically reversed, an electric bell is made to ring, and an audible signal is therefore given to the operator.

Should the operator not be free to attend to the apparatus, the pour point temperature will remain indicated until the apparatus is reset for a subsequent determination.

An improved form of suspended assembly for the pour point apparatus of FIG. 1 is described with reference to FIGS. 2 to 4 of the drawings.

Figure 4:
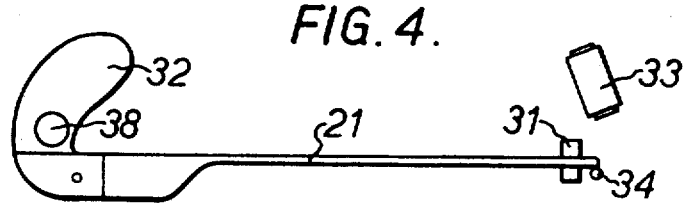
FIG. 4 shows a plan view of the suspended vane.

Referring to FIGS. 2 to 4, the movable vane 21 is attached by means of bolts 22 and bracket 23 to a copper/beryllium suspension tape 24. The two ends of this tape are both attached to separate tension adjustment brackets 25 and 26, and which are in turn fixed to the main structure of the apparatus.

Depending from the brackets 23 is a rod 27 which carries a collar 28 at its lower end. Fixed to this collar 28 is a detachable platinum resistance thermometer 29 provided with a Tufnol casing, which carries a metal ½-inch disc 30 above the bulb thereof.

Fixed to one end of the vane 21 is a small permanent magnet 31, whilst fixed to the other end is a curved arm extension piece 32 having an aperture 38.

The vane 21 is caused to move by the attraction between the magnet 31 and a solenoid 33. A stop 34 limits the movement of the vane 21 away from the solenoid 33. In this arrangement the solenoid 33 and magnet 31 cannot actually touch one another. In this manner an effective force can be maintained for sufficient time for the vane to pivot, but jamming of the mechanism is prevented which might be the case if the magnet and solenoid actually touched one another.

Movement of the vane 21 and hence the arm 32 interrupts the path between the lamp 35 and the photocell 36.

The remainder of the apparatus is similar to that described with reference to FIG. 1, except that the minimum temperature of the thermometer 29 is recorded by a potentiometric indicator (not shown).

The operation of the form of apparatus described with reference to FIGS. 2 to 4 is similar to that described with reference to FIG. 1. In this case one may set the timer to operate at intervals of about 2 minutes and the cooling pack may cool at the rate of 2° F./minute.

EXAMPLE

In this example the apparatus described with reference to FIGS. 2 to 4 was used to determine the pour point of fuel oil, diesel oil, motor oil and aviation turbo oil.

The container was filled with the sample liquid and the metal disc was arranged to be immersed to a depth of one-eighth inch in the sample liquid. The timer was arranged so that the disc was oscillated once every 2 minutes.

The bath temperature was raised to 115° F. by the cooling/heating pack and an indicator lamp indicated that the apparatus was ready. The start button was pressed and the temperature indicator showed a slow rise in the temperature of the sample liquid until it reached 115° F. per minute. The thermoelectric cooling and the sensing mechanism commenced to operate at about 100° F. and a cooling rate of 2° F./minute was maintained until the pour point had been reached.

The results obtained were given below and compared with the results obtained by Manual Methods. It is seen that the results are very good especially since the reproducibility for IP and ASTM methods is 10° F.

| Sample | Pour point °F. | |
|---|---|---|
| | Manual method (IP-15, D-97) | Automatic apparatus |
| Fuel oil | +95+95+95+95+95+95 | +93+92+92+91 |
| Do | +60+60+65+65+65+60 | +60+61+60+60+64 |
| Motor lubricant | +20+20+20+20+20+20 | +15+15+17+12+16 |
| Do | +15+15+15+15 | +12+11+11+9+10+12+13 |
| Diesel fuel | +10+10+10+15+10+10 | +6+5+10+5+7 |
| Motor lubricant | −35−35−35−35−35−40 | −29−29−29−29−29 |
| Aviation turbo oil | −75−70−70−70−70 | −62−61 |

What I claim is:

1. An apparatus suitable for detecting the change in mobility of a substance comprising a frame member, a displaceable member suspended freely by a suspension means from said frame member and positioned so that it is capable of being rotated in the substance, said suspension means including a torsional element having its upper end fixedly attached to said frame member, a displacer for intermittently applying a rotational force of predetermined magnitude to said displaceable member to torsionally flex the suspension means and displaceable member from their position of rest, a detector for detecting rotational displacements of the displaceable member in the substance, and a temperature indicator to indicate the temperature of the substance when the displaceable member in response to a series of intermittent displacing forces first remains stationary.

2. An apparatus as claimed in claim 1 wherein the displaceable member is a thermometer.

3. An apparatus as claimed in claim 2 wherein the thermometer includes a radially disposed disc affixed to a lower portion thereof for increasing the effective surface area of the thermometer immersed in said substance.

4. An apparatus as claimed in claim 1 wherein the suspension means is a thin strip of beryllium-copper alloy.

5. An apparatus as claimed in claim 1 wherein the displacer means includes an electromagnet and a vane projecting from said suspension means and responsive thereto.

6. An apparatus as claimed in claim 5 wherein the displacer is an electromagnet connected to a periodic timing device positioned so that when an electric current is passed through the magnet, the vane is attracted towards the magnet.

7. Apparatus as claimed in claim 1 wherein the detector is a photocell, the light beam to which is interrupted by the displaceable member.

8. An apparatus as claimed in claim 1 wherein the temperature indicator comprises thermocouple potentiometer means.

9. An apparatus as claimed in claim 1 including a thermoelectric cooling and heating device for raising and lowering the temperature of the substance under test.

10. An apparatus as claimed in claim 1 wherein the displaceable member carries a permanent magnet, and the displacer is a solenoid connected to a periodic timing device.

11. An apparatus as claimed in claim 10 wherein the magnet and solenoid are positioned so that they do not come in physical contact with one another when actuated.

12. An apparatus suitable for detecting the change in mobility of a substance comprising a frame member, a displaceable member suspended freely by a suspension means from said frame member and positioned so that it is capable of being rotated in the substance, said suspension means including a torsional element having its upper end fixedly attached to said frame member, a displacer for intermittently applying a displacing force of predetermined magnitude to move in a rotational direction said displaceable member relative to said substance from its position of rest in said substance, a detector for detecting rotational displacements of the displaceable member in the substance, and a temperature indicator to indicate the temperature of the substance when the displaceable member in response to a series of intermittent displacing forces first remains relative to said substance.